May 16, 1939.  H. SCHRÖDER  2,158,156
BALL BEARING AND BALLS OF CERAMIC MATERIAL
Filed Oct. 1, 1937
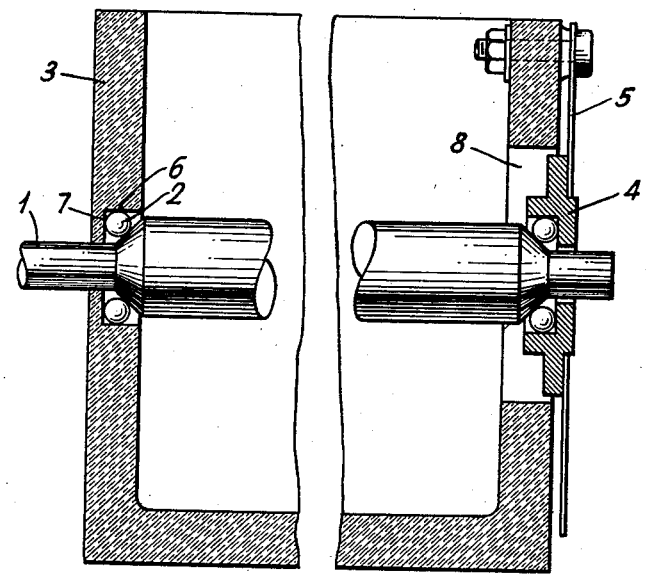
INVENTOR
HEINRICH SCHRÖDER
BY
ATTORNEY Patented May 16, 1939

2,158,156

UNITED STATES PATENT OFFICE 2,158,156

BALL BEARING AND BALLS OF CERAMIC MATERIAL

Heinrich Schröder, Berlin, Germany, assignor to Telefunken Gesellschaft für Drahtlose Telegraphie m. b. H., Berlin, Germany, a corporation of Germany Application October 1, 1937, Serial No. 166,755
In Germany October 10, 1936

7 Claims. (Cl. 308—188)

This invention relates to a new and novel arrangement of a high frequency rotatable device employing ball bearings and balls of ceramic material.

In view of the requirements of constancy of frequency demanded today of high frequency arrangements, in particular of transmitters, there exists an ever increasing desire of using ceramic materials for all parts whose shape may be susceptible of deformation due to thermic or atmospheric influences.

A high constancy of frequency can be attained provided that fixed coils or capacitances are employed, but in case of devices having movable parts, such as, for instance, variometers or variable condensers, special consideration is to be given to the supporting of the shafts.

Owing to the grinding properties of ceramic materials, it is not possible to provide a direct support with such materials, i. e. to use ceramic material for the shaft, as well as for the bearing for extended operation. Moreover, when supporting the shaft without play (for instance, by means of a conical support) the forces opposing the turning of the shaft would be too great so that the latter could not be driven by means of precision vernier drives, such as is necessary in present day arrangements without incurring detrimental flexible deflections.

When employing steel ball bearings, the thermic constancy of the arrangement would hereby again be detrimentally affected.

In accordance with the novel feature, a ball bearing having no play consists entirely of ceramic material, including the balls, such that the bearing operates without play while at the same time not preventing an easy rotation.

In practice, it is difficult to construct such ball bearings in accordance with the principle of the customary bearings having intimate lubrication between the balls and the two inner and outer races, since it is in practice hardly possible to attain in case of ceramic material the degree of accuracy necessary for producing the exact shape and diameter of the running surfaces at the races.

Therefore, the mode of construction shown in the drawing has particular advantages.

Item 1 is the turning shaft of ceramic material supported in the housing 3. The shaft has a larger center portion and is gradually reduced in diameter in the manner of a cone outwards at the two ends. The conical surfaces serve as running surfaces for the balls. In the bearing at the left the balls 2 move between the said conical surface and the two surfaces 6 and 7 obtained in the wall of the housing through a bore. In this manner, the balls are supported between three surfaces. At the right side of the housing 3, there exists a large bore 8 into which protrudes the ball bearing outer race 4 which is freely mounted on a diaphragm 5. In this bearing race, the balls likewise move between three surfaces. The diaphragm has the purpose of pressing the ball bearing race 4 against the other ball bearing whereby the shaft 1 is fixedly journaled without play between the two bearings.

The grinding work necessary for making the ball bearings can be done with simple means since in this case it is only necessary that the balls are sufficiently round while it is not so much a question of providing an accurate diameter or of maintaining exactly the angle of the cone.

The bearing arrangement shown in the figure is used to advantage for variometers or variable condensers in the construction of transmitters whereby it is of advantage if also the diaphragm 5 is made of non-metallic material, such as, for instance, glass or ceramic material.

What is claimed is:

1. In a ball bearing arrangement adapted for high frequency apparatus having fixed and movable elements, comprising a support of ceramic material for said fixed element, a shaft of ceramic material for said movable element having its ends tapered, a plurality of ball bearings of ceramic material arranged on the tapered portion of said shaft and said support to provide an insulating bearing for said movable element.

2. In a ball bearing arrangement adapted for high frequency apparatus having fixed and movable elements, comprising a support of ceramic material for said fixed element, a shaft of ceramic material for said movable element which is larger at the center portion than at its ends, and a tapered portion intermediate each of the ends of said central portion, and a plurality of ball bearings of ceramic material arranged on the tapered portion of said shaft and said support to provide an insulating bearing for said movable element.

3. In a ball bearing arrangement adapted for high frequency apparatus having fixed and movable elements, comprising a support of ceramic material for said fixed element, a shaft of ceramic material for said movable element which is larger at the center portion than at its ends, a tapered portion intermediate each of the ends of said central portion, a plurality of ball bearings of ceramic material arranged on the tapered portion of said shaft and said support to provide an insulating bearing for said movable element, and pressure means located at one end of said shaft to press said ball bearings together.

4. In a ball bearing arrangement adapted for high frequency apparatus having fixed and movable elements, comprising a support of ceramic material for said fixed element, a shaft of ceramic material for said movable element which is larger at the center portion than at its ends, and a tapered portion intermediate each of the ends of said central portion, a plurality of ball bearings of ceramic material arranged on the tapered portion of said shaft and said support to provide an insulating bearing for said movable element, and pressure means comprising a spring member located at one end of said shaft to press said ball bearings together.

5. In a ball bearing arrangement adapted for high frequency apparatus having fixed and movable elements comprising a box-like support of ceramic material for said fixed element, a shaft of ceramic material for said movable element having its ends tapered, a plurality of ball bearings of ceramic material arranged on the tapered portion of said shaft and said support to provide an insulating bearing for said movable element.

6. In a ball bearing arrangement adapted for high frequency apparatus having fixed and movable elements, comprising a box-like support of ceramic material for said fixed element, a small aperture in one end of said box-like support, and a larger aperture in the other end of said box-like support, a shaft of ceramic material for said movable element having its ends tapered, a plurality of ball bearings of ceramic material arranged on the tapered portion of said shaft and said support to provide an insulating bearing for said movable element, and pressure means located adjacent the larger aperture of said box-like member to press said ball bearings together.

7. In a ball bearing arrangement adapted for high frequency apparatus having fixed and movable elements, comprising a box-like support of ceramic material for said fixed element, a small aperture in one end of said box-like support, and a larger aperture in the other end of said box-like support, a shaft of ceramic material for said movable element having its ends tapered, a plurality of ball bearings of ceramic material arranged on the tapered portion of said shaft and said support to provide an insulating bearing for said movable element, and pressure means comprising a spring member secured to the end of said box-like member having the larger aperture.

HEINRICH SCHRÖDER.